United States Patent
Kondratiev et al.

(10) Patent No.: US 6,922,740 B2
(45) Date of Patent: Jul. 26, 2005

(54) APPARATUS AND METHOD OF MEMORY ACCESS CONTROL FOR BUS MASTERS

(75) Inventors: Vladimir L. Kondratiev, Haifa (IL); Rony Ross, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 10/442,594

(22) Filed: May 21, 2003

(65) Prior Publication Data

US 2004/0236876 A1 Nov. 25, 2004

(51) Int. Cl.[7] .............................................. G06F 13/00
(52) U.S. Cl. ..................... 710/22; 710/308; 709/212
(58) Field of Search ...................... 710/22–28, 305–308, 710/107, 112; 709/212; 711/106, 118, 143, 146

(56) References Cited

U.S. PATENT DOCUMENTS

| | | | | |
|---|---|---|---|---|
| 5,301,279 A | * | 4/1994 | Riley et al. .................... | 710/41 |
| 5,325,489 A | * | 6/1994 | Mitsuhira et al. .............. | 710/22 |
| 5,535,362 A | * | 7/1996 | Ami et al. ..................... | 711/147 |
| 5,781,799 A | * | 7/1998 | Leger et al. .................... | 710/22 |
| 5,805,927 A | * | 9/1998 | Bowes et al. .................. | 710/23 |
| 6,105,082 A | * | 8/2000 | Hirai et al. .................... | 710/28 |
| 6,820,142 B2 | * | 11/2004 | Hofstee et al. ................ | 710/25 |
| 2002/0078270 A1 | * | 6/2002 | Hofstee et al. ................ | 710/23 |
| 2003/0196076 A1 | * | 10/2003 | Zabarski et al. ............. | 712/234 |

* cited by examiner

*Primary Examiner*—Christopher B. Shin
(74) *Attorney, Agent, or Firm*—Blakely, Sokoloff, Taylor & Zafman LLP (57) ABSTRACT

A method and apparatus of memory access control for bus masters are described. In one embodiment, the method includes the receipt of a direct memory access (DMA) request from a device. Once the DMA request is received, DMA access rights of the device are determined according to an access control list (ACL). Once determined, the device is granted DMA access according to the determined memory access rights of the device. In other words, if a DMA request coincides with DMA access rights assigned to the device, the DMA request is executed. Otherwise, the operating system may be notified of an unauthorized DMA request.

30 Claims, 9 Drawing Sheets

COMPUTER SYSTEM 100

APPARATUS AND METHOD OF MEMORY ACCESS CONTROL FOR BUS MASTERS

FIELD OF THE INVENTION

One or more embodiments of the invention relate generally to the field of integrated circuit and computer system design. More particularly, one or more of the embodiments of the invention relates to a method and apparatus of memory access control for bus masters.

BACKGROUND OF THE INVENTION

Communication between devices within a computer system is typically performed using one or more buses that interconnect such devices. These buses may be dedicated buses coupling two devices or non dedicated buses that are multiplexed by a number of units and devices (e.g., bus agents). Moreover, buses within a computer system may be dedicated to transferring a specific type of information. For example, the X86 Microprocessor Architecture developed by Intel® Corporation of Santa Clara, Calif., includes a three bus system with address, data and control buses for respectively transferring data, address and control signals.

A vast amount of research and system architecture design efforts have been directed to increasing data throughput within computer systems. Technology such as data pipelining, out-of-order execution, and the like, enable advanced architectures in processing with significantly higher clock rates and world class performance. One technique for speeding up overall computer architecture operation is direct memory access (DMA). DMA is a capability provided by advanced architectures which allows data to be sent directly from an attached device to the memory on the computer's motherboard. As a result, the system's microprocessor is freed from involvement with the data transfer, thus speeding up overall computer operation.

Architectures that employ DMA channels can transfer data to and from devices much more quickly than systems which do not include DMA channels. In addition, such systems may employ bus masters, which are provided with the capability to execute direct memory access. A bus master is a program either in a microprocessor or more usually in a separate I/O controller that directs traffic on the system bus or input/output paths. The bus master is the master and the I/O devices on the bus are the slaves. As a result, the bus master controls the bus paths on which the address and control signals flow. Accordingly, once a bus master is setup, the flow of data bits goes directly between the I/O device and the memory.

Currently, well developed memory access control mechanisms exist for system microprocessors. The control provided generally defines, on a per process basis, whether certain memory pages may be accessed. Usually this mechanism is coupled with virtual to physical address translation. However, hardware devices which may be designated as bus masters are generally trusted. As a result, if a hardware card gets bus master access, it is free to perform any transaction (read/write) to/from any memory area. This imposes a high security risk and reduces system reliability. For example, a network interface controller (NIC) with bugs can write to a wrong memory region and cause unpredictable damage. Moreover, a network card who's firmware is hacked can grab the contents of the whole physical memory and send it to a remote location.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and an apparatus of memory access control for bus masters are described. In one embodiment, the method includes the receipt of a direct memory access (DMA) request from a device. Once the DMA request is received, DMA access rights of the device are determined according to an access control list (ACL). Once determined, the device is granted DMA access according to the determined memory access rights of the device. In other words, if a DMA request coincides with DMA access rights assigned to the device, the DMA request is executed. Otherwise, the operating system may be notified of an unauthorized DMA request.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

An example of "software" includes executable code in the form of an application, an applet, a routine or even a series of instructions. The software may be stored in any type of computer or machine readable medium such as a programmable electronic circuit, a semiconductor memory device inclusive of volatile memory (e.g., random access memory, etc.) and/or non-volatile memory (e.g., any type of read-only memory "ROM," flash memory), a floppy diskette, an optical disk (e.g., compact disk or digital video disk "DVD"), a hard drive disk, tape, or the like. In one embodiment, the present invention may be provided as an article of manufacture which may include a machine or computer-readable medium having stored thereon instructions which may be used to program a computer (or other electronic devices) to perform a process according to one embodiment of the present invention.

System

Figure 1:
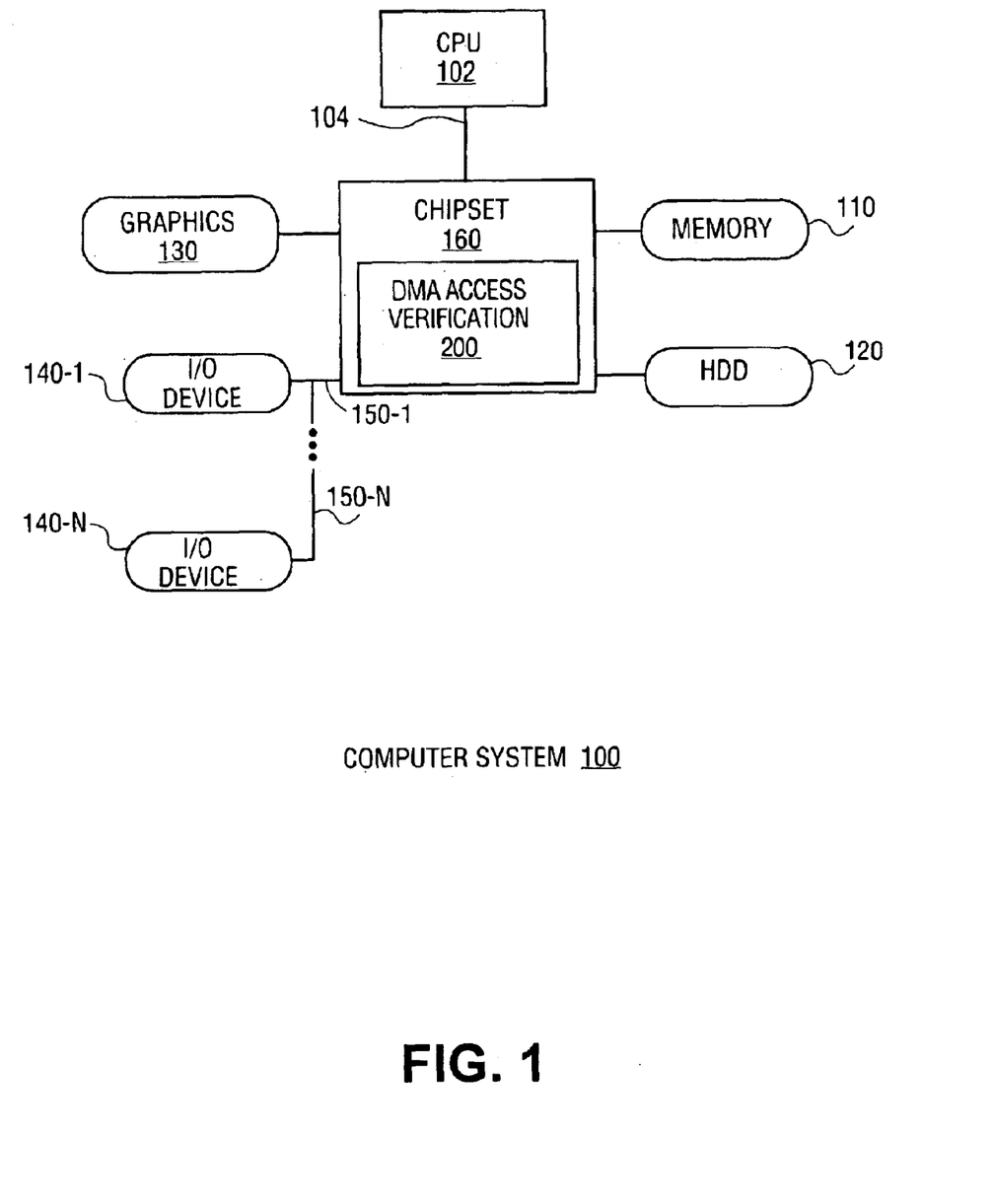
FIG. 1 is a block diagram illustrating a computer system including direct memory access (DMA) access verification logic, in accordance with one embodiment of the invention.

FIG. 1 is a block diagram illustrating a computer system 100 including direct memory access (DMA) access verification logic 200, in accordance with one embodiment of the invention. Computer system 100 comprises a processor system bus (front-side bus (FSB)) 102 for communicating information between a processor (CPU) 102 and a chipset 160, coupled together via FSB 104. As described herein, the term "chipset" is used in a manner well known to those of ordinary skill in the art to describe collectively, the various devices coupled to the CPU 102 to perform desired system functionality. Although the embodiment depicted illustrates DMA logic within chipset 160, DMA logic 200 may be embodied within, for example, device cards.

The chipset 160 is also coupled to main memory 110 and one or more graphics devices 130. In one embodiment, main memory 110 is a volatile memory including, but not limited to, random access memory (RAM), synchronous RAM (SRAM), double data rate (DDR), S-data RAM (SDRAM), rambus data RAM (RDRAM), or the like. In addition, hard disk drive devices (HDD) 120, as well as one or more input/output (I/O) devices 140 (140-1, . . . , 140-N) are also coupled to chipset 110, I/O buses, interconnects 150 (150-1, . . . , 150-N). In one embodiment, FSB 104 is compatible with a Pentium®4 front-side bus and is a pipelined data bus that includes address data and control portions, which may alternatively be referred to herein as "address data" and "control buses."

Devices coupled to FSB 104 are also referred to herein as "bus agents" in reference to FSB 104. For one embodiment, three types of agents may reside on FSB 104: request agents, response agents and snoop agents. In addition, bus agents are divided into symmetric agents and priority agents. As such, the various agents are required to arbitrate for access to FSB 102, in order to initiate a transaction. For example, as illustrated with reference to FIG. 1, chipset 160 may be designated as a priority agent, while CPU 102 is designated as a symmetric agent, such that during arbitration chipset 110, which is a priority agent, is awarded bus access when competing with CPU 102 when designated as a symmetric bus agent.

For the purposes of this specification, the term "transaction" is defined as bus activity related to a single bus access request. Generally, a transaction may begin with bus arbitration and the assertion of a signal, such as an address strobe signal (ADS#) and the propagation of a transaction address. A transaction, as defined by the Intel® architecture (IA) specification, may include several phases, each phase using a specific set of signals to communicate a particular type of information. Phases may include an arbitration phase (for bus ownership), a request phase, as indicated by the ADS# signal, a snoop phase, a response phase and a data transfer phase.

Within computer systems, such as computer system 100, memory access latency or the time required to write or read data from memory 110 is often seen as a system bottleneck. Accordingly, one technique for alleviating the memory bottleneck is direct memory access (DMA). DMA is a capability provided by advanced architectures which allows direct transmission of data from an attached device to the memory on the computer's motherboard. As a result, the system's microprocessor is free from involvement with the data transfer, thus speeding up overall computer operation.

Accordingly, in order to implement DMA access within computer system 100, devices with DMA access are designated as bus masters. A bus master is a program either in a microprocessor or more usually in a separate I/O controller that directs traffic on the system bus or input/output (I/O) paths. For example, as depicted with reference to FIG. 1, I/O devices 140 are coupled to chipset 160 via I/O buses 150. In operation, a bus master of I/O bus 150 makes a request to the operating system (OS) for an assignment of a portion of memory 110 which is designated or enabled for direct memory access.

The OS is responsible for designating a certain area of memory 110 as DMA enabled memory. Within the DMA enabled memory area, the OS will assign portions of this area to the various bus masters within the system 100. Once the assignment is received, the bus master is said to have established a DMA channel between the bus master and the main memory 110. As a result, during operation, when an I/O device such as I/O device 140 requires read-write access to memory 110, the bus master of I/O bus 150 performs a DMA access request to chipset 150.

In conventional systems, chipset 150 simply executes the DMA access request to memory 110 without intervention of CPU 102. This paradigm is based on the premise that the bus master is a trusted device. Unfortunately, this premise imposes a high security risk and reduces system reliability. For example, a network interface controller (NIC) with bugs can write to a wrong memory region and cause unpredictable damage. Moreover, a network card with hacked firmware is able to freely grab physical memory and send the contents of memory to a remote location. In other words, once a computer system device is given bus master access, the device is free to perform any transaction (read/write) to/from any memory area.

Accordingly, in one embodiment, chipset 150 includes DMA access verification logic 200. In one embodiment, the DMA access verification logic is required to determine memory access rights of a device making a DMA access request. In one embodiment, this check is performed by accessing an access control list (ACL) data structure according to the device ID to determine whether the device is a bus master and what DMA access rights are assigned to the device. For example, as depicted with reference to FIG. 2. In an alternative embodiment, an ACL may be used for verification of device to device memory access by initially granting such access and verifying future inter-device memory access requests.

Figure 2:
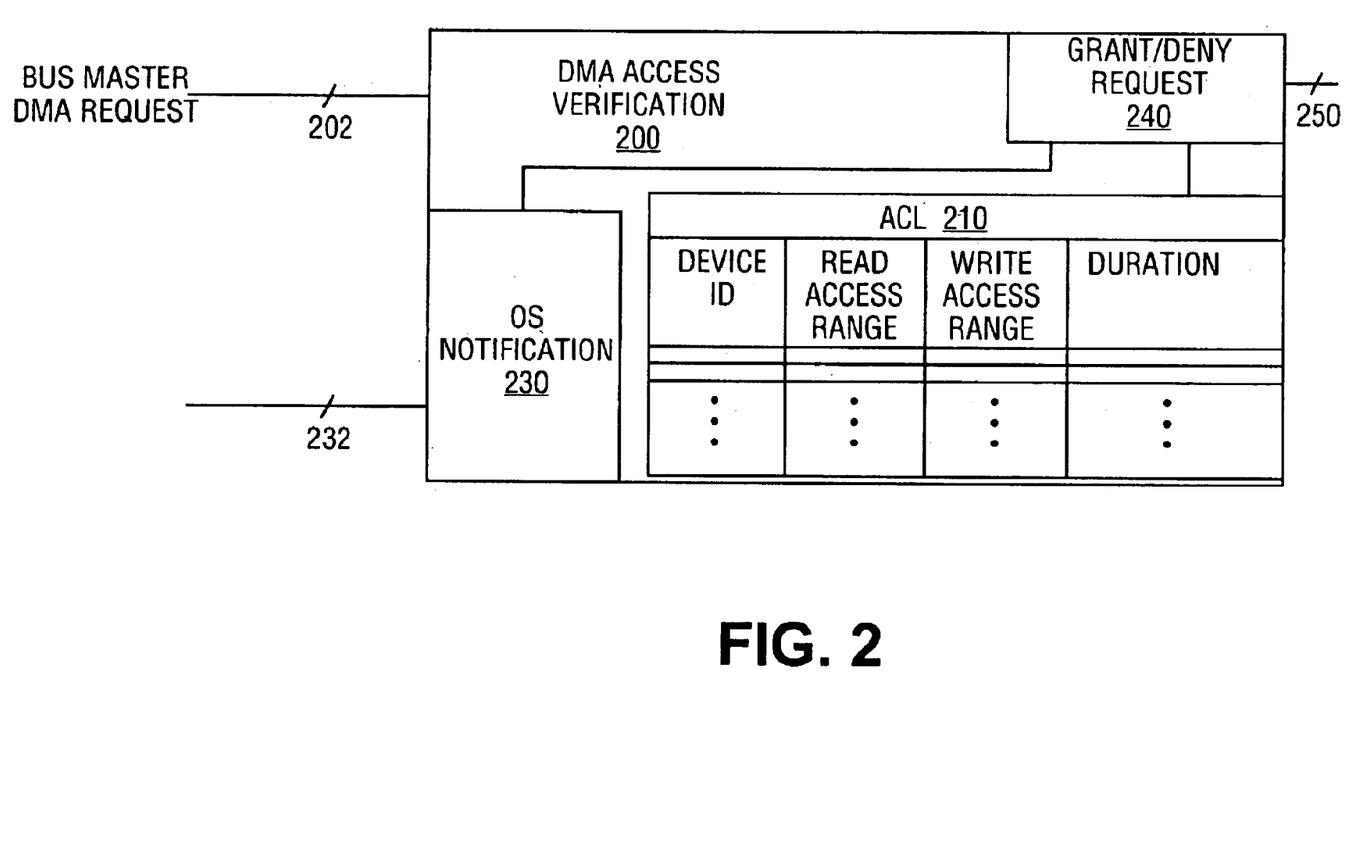
FIG. 2 is a block diagram illustrating DMA access verification logic, in accordance with a further embodiment of the invention.

FIG. 2 is a block diagram illustrating DMA access verification logic 200, as depicted in FIG. 1, according to one embodiment of the invention. The verification logic 200 receives DMA access request 202 from various bus masters of the system 100. Once received, the grant/deny logic 240 queries ACL 210 based on a device ID and grants DMA requests that comply with assigned DMA rights. In one embodiment, ACL 210 contains a device ID, a read access memory range, a write access memory range, and an optional indication of whether DMA granted rights are limited to a duration of time. In an alternative embodiment, DMA access rights may be defined according to memory ranges and assigned permissions.

In one embodiment, the OS is responsible for populating ACL 210 based on initial DMA assignment requests. The OS maintains ACL 210 for devices with time limited DMA access rights and additional DMA assignment requests. In an alternative embodiment, device drivers (e.g., I/O, graphics, video, etc.) are responsible for populating and maintaining ACL 210. In one embodiment, ACL 210 is initially formed during system boot-up by the system BIOS (basic input/output system). In an alternative embodiment, the OS is responsible for creation of the ACL data structure 210.

Figure 3:
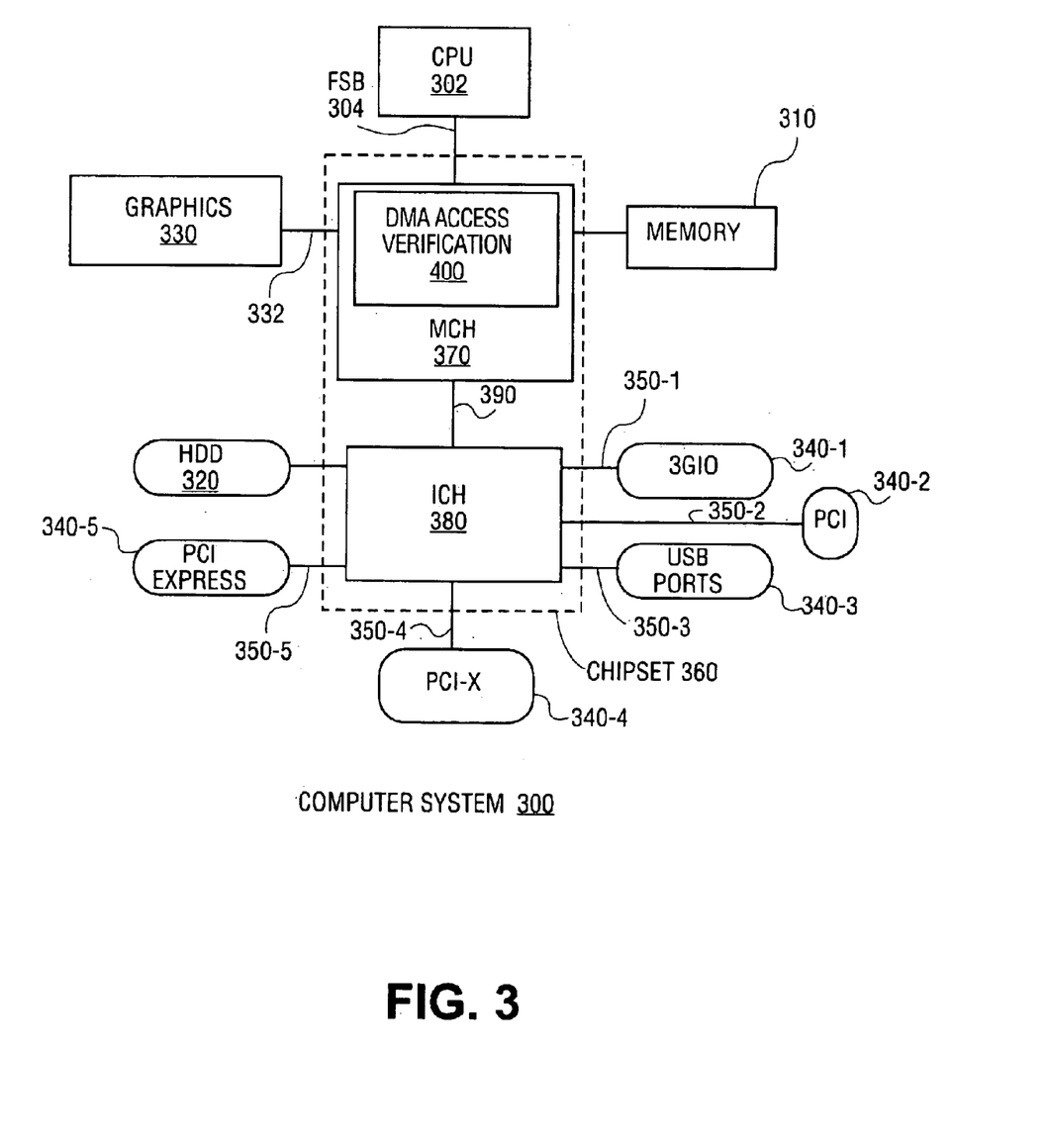
FIG. 3 is a block diagram illustrating a computer system including a memory controller having DMA access verification logic, in accordance with a further embodiment of the invention.

FIG. 3 depicts a computer system 300 including a chipset 360 comprised of a memory controller or a memory controller hub (MCH) 370 coupled to an I/O controller or I/O controller hub (ICH) 380. MCH 370 and ICH 380 are coupled via a system I/O bus 360. As illustrated, MCH 370 includes DMA access verification logic 200. In one embodiment, computer system 300, as well as DMA access verification logic 200 are configured in accordance with the embodiments shown in FIGS. 1 and 2. However, within computer system 300, the various I/O devices may include third generation I/O (3GIO) interconnects or buses, peripheral component interconnect (PCI) buses 340-2, universal serial bus (USB) ports 340-3, PCI-X buses or interconnects 340-4, and PCI-express interconnects (collectively referred to herein as "device I/O buses") coupled via I/O buses 350 (350-1, . . . , 350-4).

Generally, the various device I/O buses are connected to the chipset via device cards. As such, the device cards will enable connection of various I/O devices. In one embodiment, the device cards are assigned bus master access. Accordingly, within the embodiment depicted, a bus master of a device I/O bus 150 is required to execute DMA access requests to MCH 370, via ICH 380. Accordingly, utilizing the DMA access verification logic 400, MCH 370 is able to verify whether DMA access rights assigned to the I/O device comply with the current DMA access request of the device. This verification may be in the form of comparing a DMA request memory address with an assigned DMA read access range or a DMA write access range.

Figure 4:
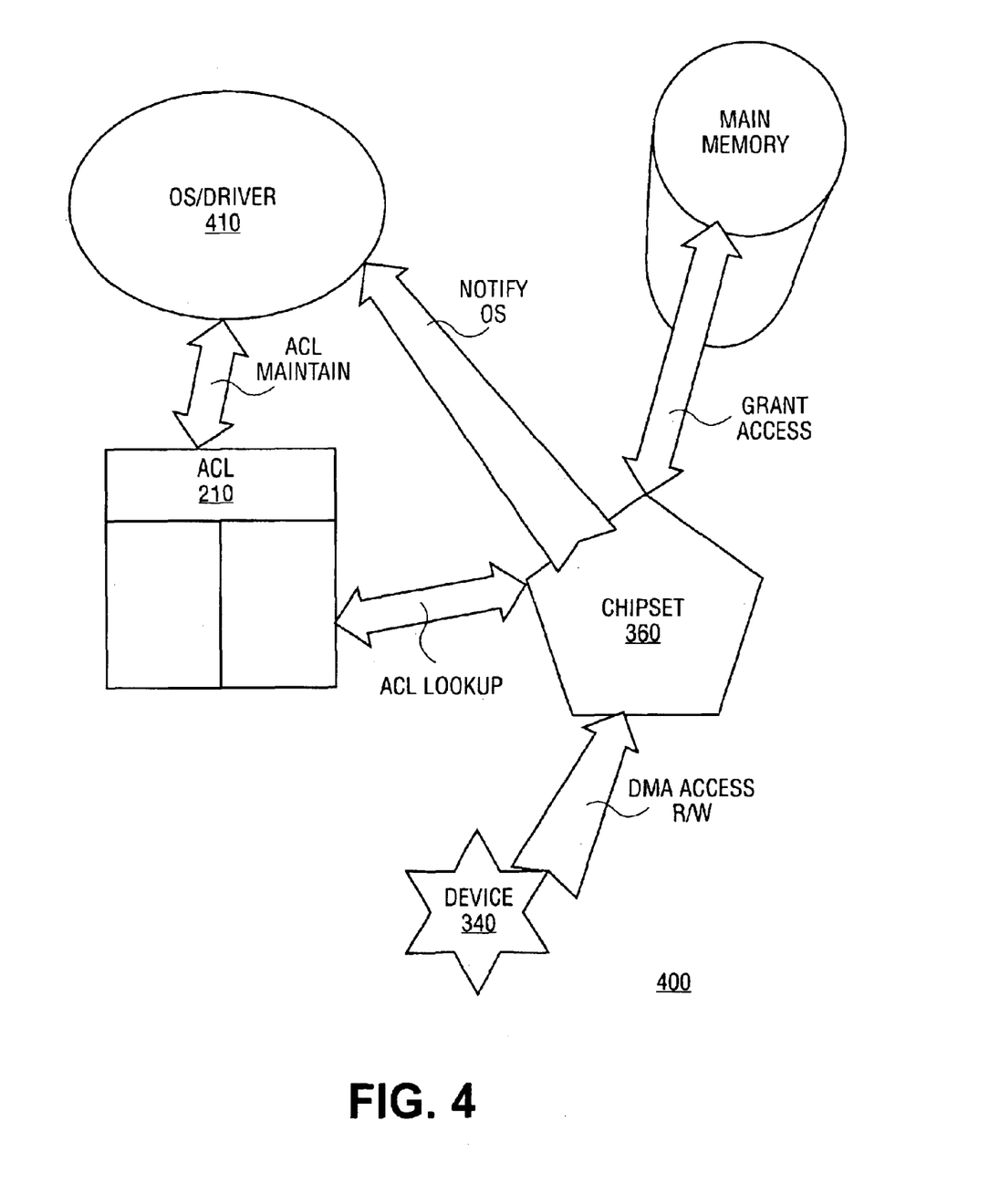
FIG. 4 is a block diagram of DMA access verification, in accordance with one embodiment of the invention.

In one embodiment, when compliance is detected, MCH 370 allows the access request to execute and either read or write data to/from system memory 310. However, when the DMA access request does not comply with DMA access rights assigned to the device, the DMA access request is not executed. In addition, MCH 370 may notify the operating system to issue, for example, a system management interrupt (SMI), as shown in FIG. 4 using OS notification block 230 (FIG. 2). The device may also be disabled, as well as removing any access rights within ACLs of the computer system. Procedural methods for implementing embodiments of the invention are now described with reference to FIG. 4.

Operation

Figure 5:
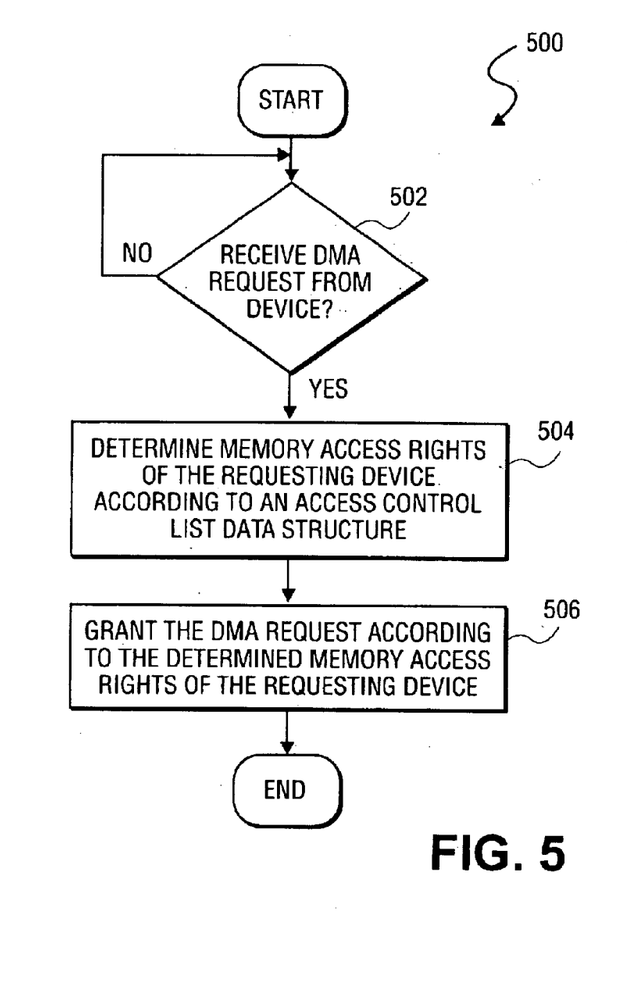
FIG. 5 is a flow chart illustrating a method for DMA access verification of a requesting device, in accordance with one embodiment of the invention.

FIG. 5 is a flow chart illustrating a method 500 for performing direct memory access (DMA) verification of a requesting device, in accordance with one embodiment of the invention, described with reference to FIG. 4. At process block 502, it is determined whether a DMA request is received from a device. In one embodiment, the device is a bus master coupled to a chipset 360, as depicted with reference to FIGS. 3 and 4. Once received at process block 504, memory access rights of the requesting device are determined according to an access control list data structure, for example, as depicted with reference to FIG. 2. At process block 520, the DMA access request is granted according to the determined memory access rights of the requesting device. In other words, if the DMA request coincides with DMA access rights assigned to the device, the DMA request is executed.

Figure 6:
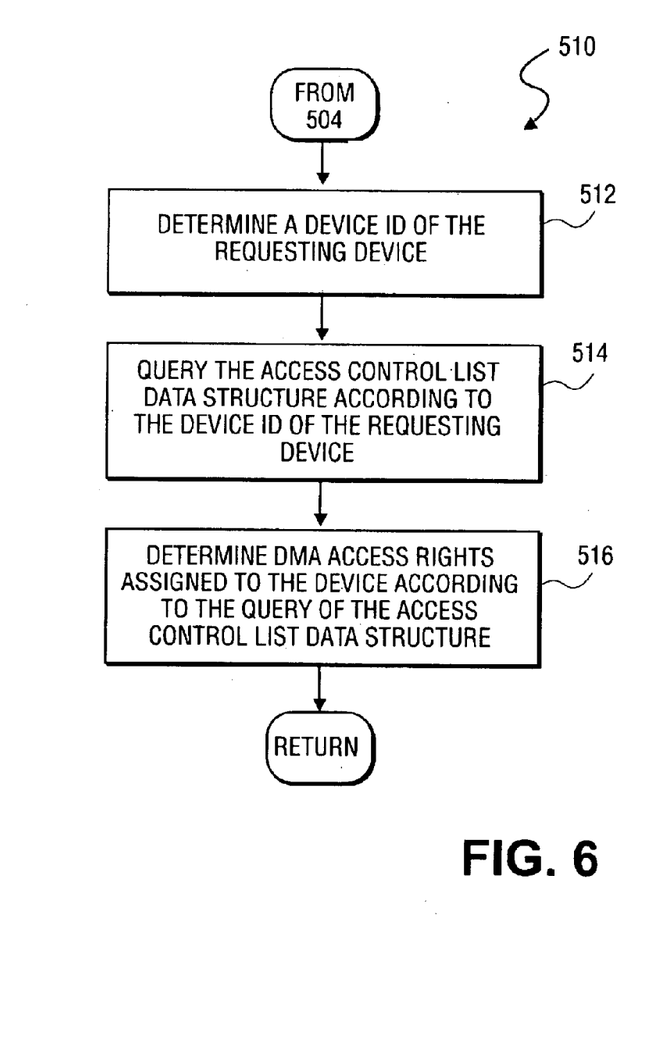
FIG. 6 is a flow chart illustrating a method for determining memory access rights of a requesting device, in accordance with one embodiment of the invention.

FIG. 6 is a flow chart illustrating a method 510 for determining memory access rights of a requesting device, according to one embodiment of the invention. At process block 512, a device ID of the requesting device is determined. At process block 514 the ACL is queried according to the device ID, as depicted with reference to FIG. 4, or (ACL lookup). At process block 516, DMA access rights assigned to the device are determined according to the query of the ACL. In one embodiment, the ACL data structure includes DMA read access rights, DMA write access rights, and an indication of whether the assigned DMA access rights are time limited. ACL data structure may be implemented as a data structure in memory, within chipset registers, or other like system storage areas.

Figure 7:
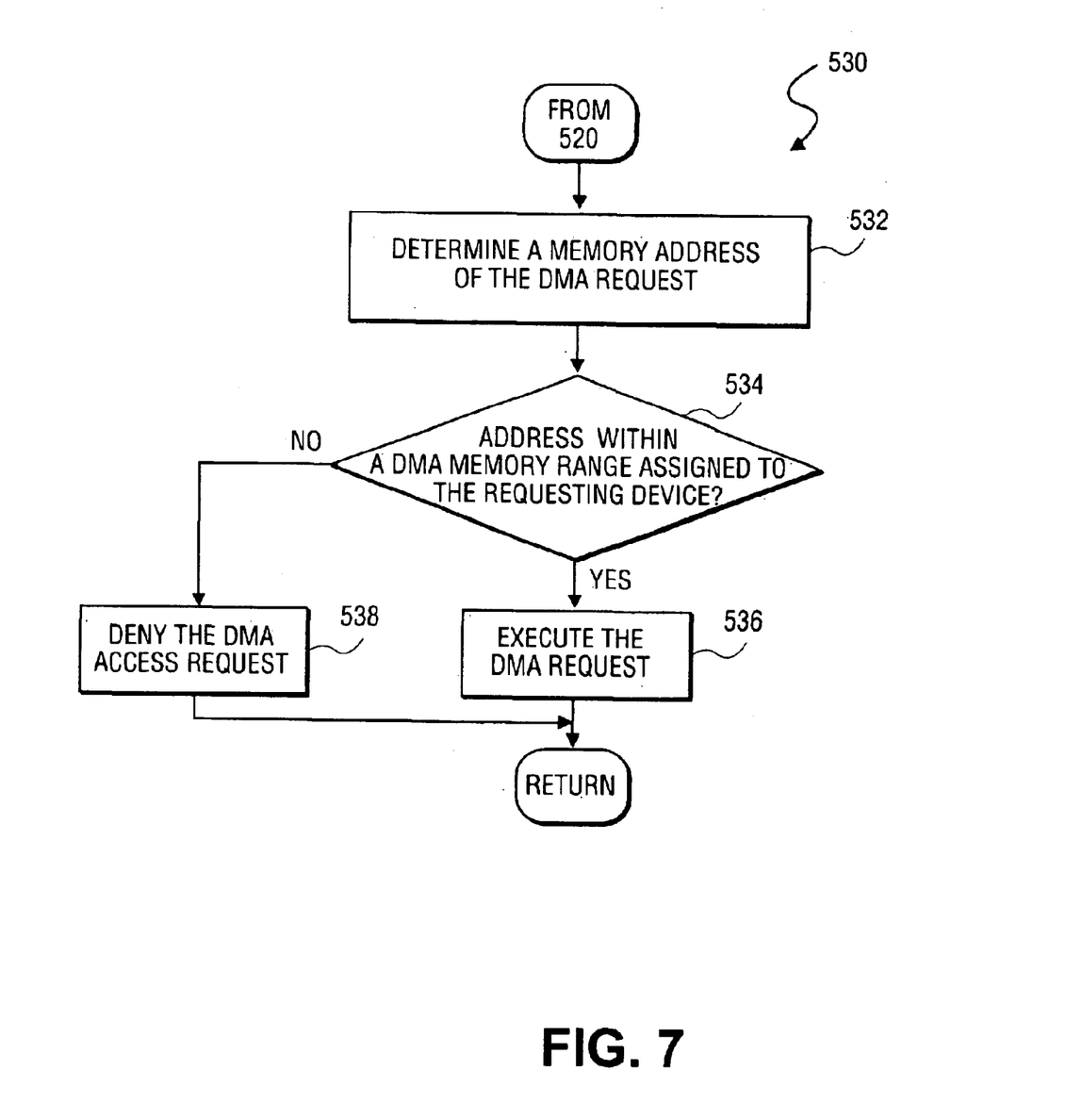
FIG. 7 is a flow chart illustrating a method for determining whether to grant a DMA access request according to memory access rights of a requesting device, in accordance with one embodiment of the invention.

FIG. 7 is a flow chart illustrating a method 530 for granting a DMA request, in accordance with one embodiment of the invention. At process block 532, a memory address associated with the DMA access request is determined. At process block 534, it is determined whether the determined address falls within a DMA memory range assigned to the requesting device. At process block 536 the DMA access request is executed if DMA memory range falls within DMA memory range assigned to the requesting device. Otherwise, the DMA access request is denied at process block 538.

In other words, the ACL may contain a memory range assigned to the device. In one embodiment, DMA requests are limited to reads or writes within the assigned memory range. Accordingly, by limiting DMA access requests to those falling within assigned DMA read or write memory ranges, faulty or possibly hacked bus master devices are prohibited from performing unauthorized memory requests which may cause problematic system behavior or threaten device security.

In one embodiment, denial of a DMA access request may result in notification of the operating system of the unauthorized DMA access request. In one embodiment, the operating system may be notified to issue a system management interrupt (SMI). Additionally, DMA access rights of the device may be disabled in addition to disabling of the device. In a further embodiment, the operating system is notified of unauthorized access requests for devices that have not been assigned DMA access rights or bus master privileges.

Figure 8:
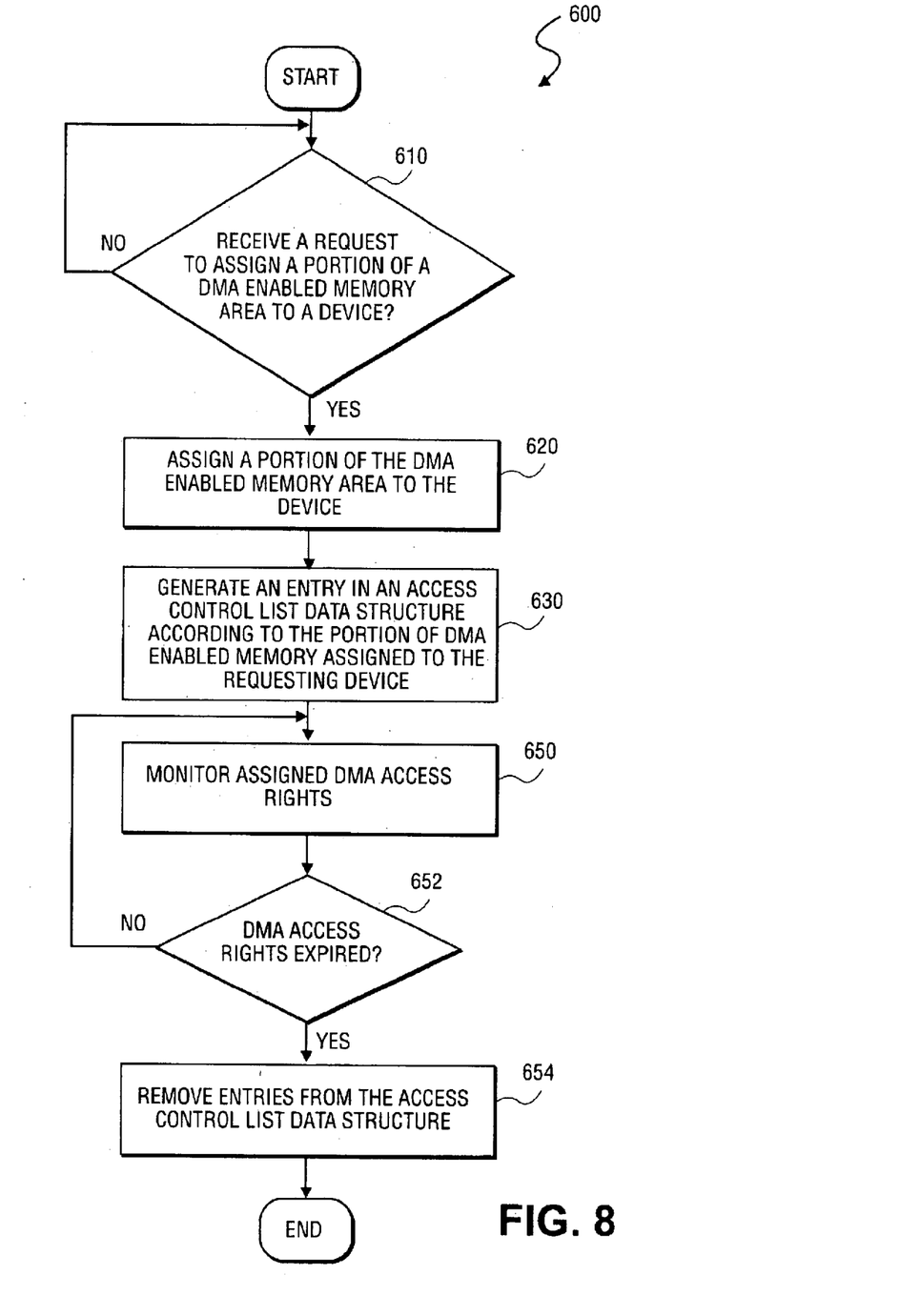
FIG. 8 is a flow chart illustrating a method for generating an access controller's data structure for tracking and monitoring DMA access rights granted to requesting devices, in accordance with one embodiment of the invention.

FIG. 8 is a flow chart illustrating a method 600 for assigning DMA access rights to bus master devices in order to enable DMA access verification, in accordance with one embodiment of the invention. At process block 610, it is determined whether a request is received to assign a portion of DMA enabled memory to a device. In other words, following device boot-up, bus master devices are required to, for example, invoke a function to request an assignment of DMA enabled memory to enable subsequent DMA read/write access during system operation.

Accordingly, at process block 620, a portion of DMA enabled memory is assigned to the device. Once assigned, at process block 630 an entry into an ACL data structure is generated, according to the portion of DMA enabled memory assigned to the requesting device. In one embodiment, assignment of DMA access rights is performed by, for example, the operating system. In an alternative embodiment, system drivers such as I/O drivers, graphics drivers, or the like, may be responsible for the DMA access assignment, as well as population of the ACL list to enable subsequent verification of DMA access requests.

At process block 650, assigned DMA access rights are monitored by, for example, the OS or system drivers. At process block 652 it is determined whether DMA access rights granted to a device expired. When expired rights are detected, at process block 654, entries from the ACL data structure are removed by, for example, the operating system. Accordingly, by monitoring subsequent memory access requests, the OS may be responsible for ensuring that DMA access rights that have been assigned for a limited portion of time are revoked once the time has expired. Accordingly, additional DMA access requests for devices with expired rights are prohibited.

Figure 9:
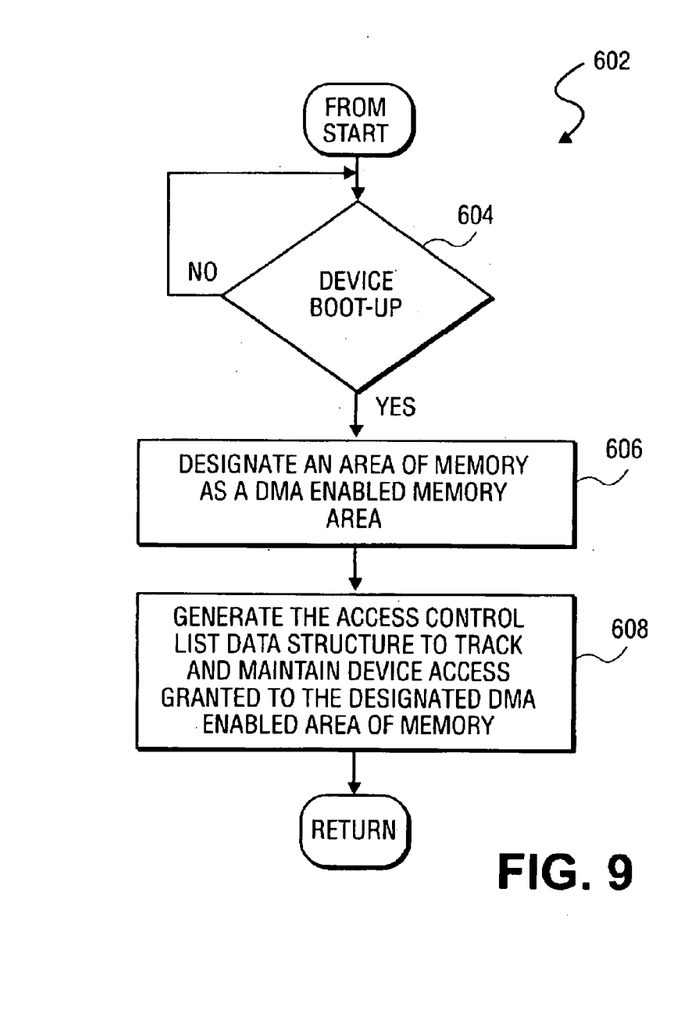
FIG. 9 is a flow chart illustrating a method for generating of the DMA access control list, in accordance with the further embodiment of the invention.

FIG. 9 is a flow chart illustrating a method 602 performed prior to receiving a DMA access assignment request. At process block 604, it is determined whether system boot-up has occurred. Once system boot-up has occurred at process block 606, an area of memory is designated as "a DMA enabled memory area " by, for example, the operating system. Once designated, at process block 608 the ACL data structure is generated to track and maintain device access granted to the designated DMA enabled area of memory. In one embodiment, this may also be performed by either the operating system or system drivers.

Figure 10:
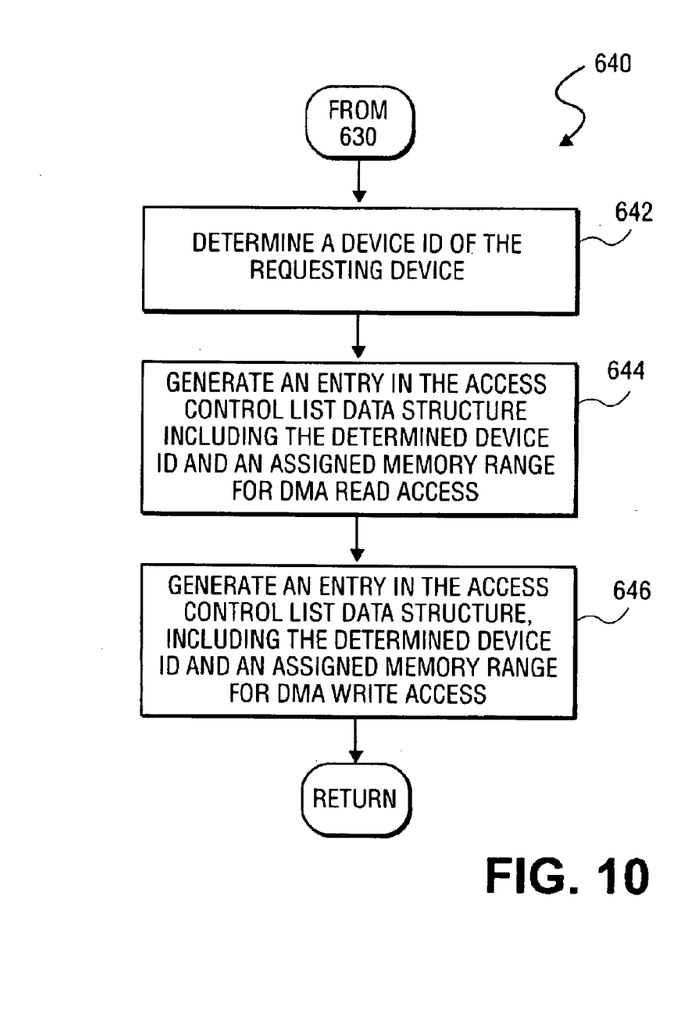
FIG. 10 is a flow chart illustrating a method for populating the access control list data structure to maintain and track DMA assigned rights to requesting devices.

FIG. 10 is a flow chart illustrating a method 640 for generating entries in the ACL data structure in accordance with one embodiment of the invention. At process block 642, a device ID of the requesting device is determined. Once determined, at process block 644 an ACL data structure is generated, including the determined device ID and an assigned memory range for DMA read access. At process block 646, an entry is generated in the ACL data structure including the determined device ID and an assigned memory range for write access.

In a further embodiment, a designation may be generated in the ACL data structure for DMA access rights that are time limited and, therefore, require subsequent monitoring to remove the DMA access rights, once the access rights have expired. Accordingly, by monitoring DMA access rights, as well as verifying DMA access requests, one embodiment of the invention provides higher reliability and security for computers, including both personal computers and servers. Accordingly, when implemented within PCs and servers, the PCs, as well as servers may be implemented within minutes of critical applications which require high grade reliability and security.

Figure 11:
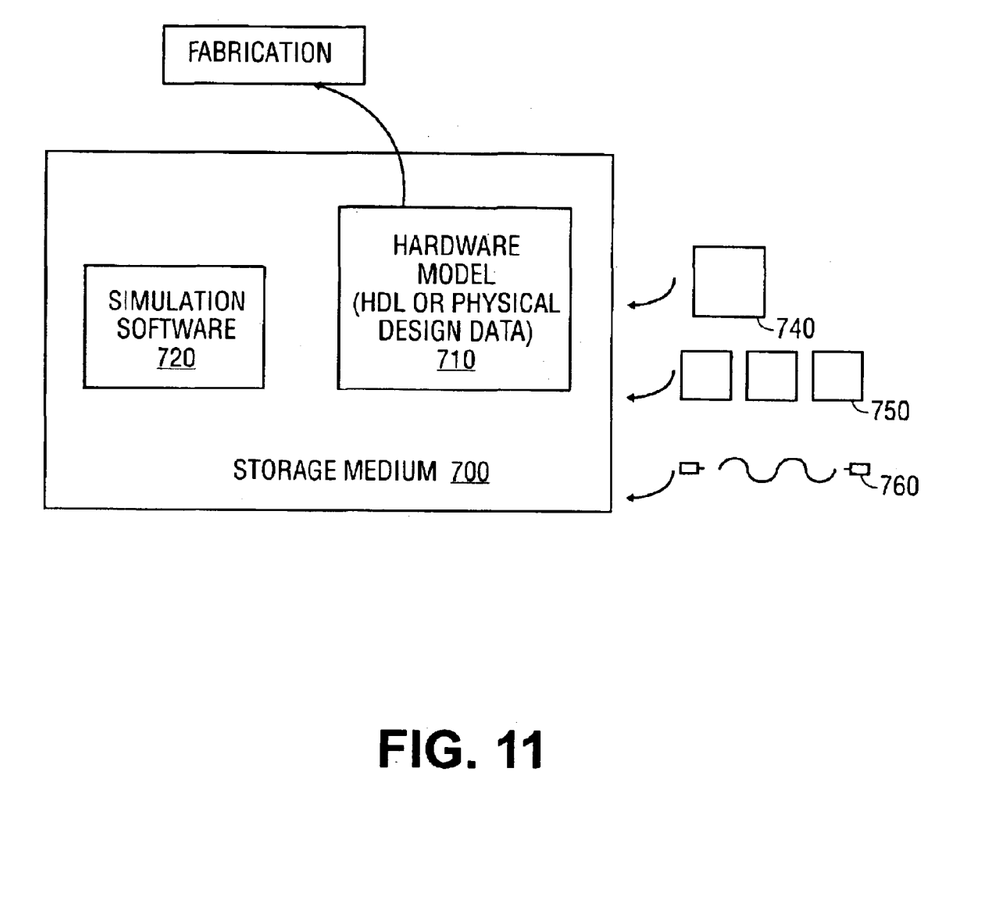
FIG. 11 is a block diagram illustrating various design representations or formats for simulation, emulation, and fabrication of a design using the disclosed techniques.

FIG. 11 is a block diagram illustrating various design representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. An optical or electrical wave 760 modulated or otherwise generated to transport such information, a memory 750 or a magnetic or optical storage 740, such as a disk, may be the machine readable medium. Any of these mediums may carry the design information. The term "carry " (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Alternate Embodiments

Several aspects of one implementation of the DMA access verification for providing improved system security have been described. However, various implementations of the DMA access verification provide numerous features including, complementing, supplementing, and/or replacing the features described above. Features can be implemented as part of the chipset or as part of the memory controller in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a DMA access verification, it will be appreciated by those skilled in the art that the embodiments of the present invention can be applied to other systems. In fact, systems for memory access verification for inter-device memory access, such as, for example, hard-disk to hard-disk memory access using an ACL, fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   receiving a direct memory access (DMA) request from a requesting device;
   determining memory access rights of the requesting device according to an access control list data structure; and
   granting the DMA request according to the determined memory access rights of the requesting device.

2. The method of claim 1, wherein determining the memory access rights further comprises:
   determining a device ID of the requesting device;
   querying the access control list data structure according to the device ID of the requesting device; and
   determining DMA access rights assigned to the requesting device based on a result of querying the access control list data structure.

3. The method of claim 2, further comprises:
   notifying an operating system to serve a system management interrupt if the device ID is missing from the access control list data structure.

4. The method of claim 1, wherein granting the DMA request further comprising:
   determining a memory address of the DMA request;
   executing the DMA request if the memory address falls within a DMA memory range assigned to the requesting device; and
   denying the DMA access request if the memory address falls outside a DMA memory range assigned to the requesting device.

5. The method of claim 4, wherein denying the DMA request further comprises:
   notifying an operating system to issue a system management interrupt; and
   disabling memory access rights to the requesting device.

6. A method comprising:
   assigning a portion of the DMA enabled memory area to the device in response to a request; and
   generating an entry in an access control list data structure according to the portion of DMA enabled memory assigned to the requesting device.

7. The method of claim 6, wherein the method comprises, prior to receiving the request:
   designating, after system boot-up, an area of memory as a DMA enabled memory area; and
   generating the access control list data structure to track and maintain device access granted to the designated DMA enabled area of memory.

8. The method of claim 6, wherein assigning the portion of DMA enabled memory further comprises:
   determining the area of memory designated for DMA access; and
   assigning a portion of the DMA enabled memory area to the requesting device if the requesting device is a hardware bus master.

9. The method of claim 5, wherein generating an entry in the access control list data structure comprises:
   determining a device ID of the requesting device;
   storing a first entry in the access control list data structure including the device ID and an assigned memory range for DMA read access; and
   storing a second entry in the access control list data structure, including the device ID and an assigned memory range for DMA write access.

10. The method of claim 5, further comprising:
    monitoring granted DMA access rights; and
    removing entries from the access control list data structure once DMA access rights granted to a device have expired.

11. An article of manufacture including a machine readable medium having stored thereon instructions which may be used to program a system to perform a method, comprising:
    receiving a request to assign a portion of a direct memory access (DMA) enabled memory area to a device in response to a request;
    assigning a portion of the DMA enabled memory area to the device in response to a request; and
    generating an entry in an access control list data structure according to the portion of DMA enabled memory assigned to the requesting device.

12. The article of manufacture of claim 11, wherein the method comprises, prior to receiving the request:
    designating, after system boot-up, an area of memory as a DMA enabled memory area; and
    generating the access control list data structure to track and maintain device access granted to the designated DMA enabled area of memory.

13. The article of manufacture of claim 11, wherein assigning the portion of DMA enabled memory further comprises:
    determining the area of memory designated for DMA access; and
    assigning a portion of the DMA enabled memory area to the requesting device if the requesting device is a hardware bus master.

14. The article of manufacture of claim 11, wherein generating an entry in the access control list data structure comprises:
    determining a device ID of the requesting device;
    storing a first entry in the access control list data structure including the device ID and an assigned memory range for DMA read access; and
    storing a second entry in the access control list data structure, including the device ID and an assigned memory range for DMA write access.

15. The article of manufacture of claim 11, further comprising:
    monitoring granted DMA access rights; and
    removing entries from the access control list data structure once DMA access rights granted to a device have expired.

16. An integrated circuit, comprising:
    a bus; and
    a controller coupled to a bus, the controller to execute a direct memory access (DMA) request from a requesting device if the DMA request is in compliance with DMA rights granted to the requesting device as defined in an access control list data structure in response to a DMA assignment request of the device.

17. The integrated circuit of claim 16, wherein the controller is to query the access control list data structure according to a device ID of the requesting device to determine DMA access rights assigned to the requesting device, and to execute the DMA request if a memory address of the request falls within a DMA memory range assigned to the requesting device.

18. The integrated circuit of claim 16, wherein the controller is to deny the DMA access request if a memory address of the request falls outside a DMA memory range assigned to the requesting device and notifying an operating system to issue a system management interrupt.

19. The integrated circuit of claim 16, wherein the controller is a chipset.

20. The integrated circuit of claim 16, wherein the controller is a memory controller.

21. The integrated circuit of claim 16, wherein the requesting device is a hardware bus master.

22. A system comprising:
   one or more devices;
   an input/output (I/O) controller coupled to the one or more devices;
   a memory;
   a memory controller coupled to the I/O controller via an I/O bus and to the memory via a memory bus, the memory controller to grant a direct memory access (DMA) request from a requesting device if the DMA request is in compliance with DMA access rights granted to the requesting device; and
   an operating system loaded within the memory to assign a portion of the DMA enabled memory area to a device and generate an entry in an access control list data structure according to the portion of DMA enabled memory assigned to the device.

23. The system of claim 22, wherein the controller is to query an access control list data structure according to a device ID of the requesting device to determine DMA access rights assigned to the requesting device, and to execute the DMA request if a memory address of the request falls within a DMA memory range assigned to the requesting device.

24. The system of claim 22, wherein the controller is to deny the DMA access request if a memory address of the request falls outside a DMA memory range assigned to the requesting device and notify an operating system to issue a system management interrupt.

25. The system of claim 22, wherein the memory controller and the I/O controller comprise a chipset.

26. The system of claim 22, wherein the memory is a double data rate memory.

27. The system of claim 22, wherein the device is a hardware bus master.

28. An article comprising a machine readable carrier medium carrying data which when loaded into a computer system memory in conjunction with simulation routines provides functionality of a model comprising:
   a bus; and
   a controller coupled to a bus, the controller to execute a direct memory access (DMA) request from a requesting device if the DMA request is in compliance with DMA rights granted to the requesting device as defined in an access control list data structure in response to a DMA assignment request of the device.

29. The article of claim 28, wherein the controller is to query an access control list data structure according to a device ID of the requesting device to determine DMA access rights assigned to the requesting device, and to execute the DMA request if a memory of the DMA request address falls within a DMA memory range assigned to the requesting device.

30. The article of claim 28, wherein the controller is to deny the DMA access request if a memory address of the DMA request falls outside a DMA memory range assigned to the requesting device and notify an operating system to issue a system management interrupt.

* * * * *